United States Patent
Giannone et al.

(10) Patent No.: US 8,961,707 B2
(45) Date of Patent: Feb. 24, 2015

(54) CORE UN-BLOCKING ROLLER BRUSH

(75) Inventors: Joseph Giannone, Lancaster, CA (US); Christopher R. Wirz, Lancaster, CA (US); Craig Scott, Lancaster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 183 days.

(21) Appl. No.: 13/163,494

(22) Filed: Jun. 17, 2011

(65) Prior Publication Data

US 2012/0318294 A1  Dec. 20, 2012

(51) Int. Cl.
- *B08B 9/00* (2006.01)
- *B29C 37/02* (2006.01)
- *A46B 7/10* (2006.01)
- *A46B 13/00* (2006.01)

(52) U.S. Cl.
CPC . *B29C 37/02* (2013.01); *A46B 7/10* (2013.01); *A46B 13/001* (2013.01); *A46B 2200/3073* (2013.01)
USPC .............. 134/166 R; 134/43; 134/93; 15/160

(58) Field of Classification Search
None
See application file for complete search history.

(56) References Cited

U.S. PATENT DOCUMENTS

| | | | |
|---|---|---|---|
| 3,768,109 A | 10/1973 | Wardell | |
| 4,061,812 A | 12/1977 | Gilwee, Jr. et al. | |
| 4,271,876 A | 6/1981 | Nash et al. | |
| 2003/0017248 A1 | 1/2003 | Gray | |
| 2007/0169720 A1 | 7/2007 | Roy | |
| 2009/0100615 A1 | 4/2009 | Schemmel et al. | |
| 2009/0249579 A1 | 10/2009 | Aramaki et al. | |

FOREIGN PATENT DOCUMENTS

| | | |
|---|---|---|
| CH | 504187 A | 3/1971 |
| DE | 100184 C | 2/1898 |
| DE | 3417913 | 11/1985 |
| EP | 0090889 A1 | 10/1983 |
| JP | 08117713 | 5/1996 |

OTHER PUBLICATIONS

Lukkassen, Dag et al., Part V: Fabrication processes, Advanced Materials and Structures and their Fabrication Processes, Book manuscript, Narvik University College, HiN, Aug. 23, 2007. pp. 212-258.

*Primary Examiner* — Eric Golightly
(74) *Attorney, Agent, or Firm* — McDermott Will & Emery LLP

(57) ABSTRACT

An unblocking roller for removing excess material from the openings of cells of a honeycomb core is disclosed. The unblocking roller includes a cylindrical core having a center axis and a plurality of clusters each comprising a plurality of bristles. Each of the plurality of bristles of each cluster is coupled to the core at a first end and projecting outward from the core. Each bristle projects a minimum of a first distance from the core. Each cluster is separated from adjacent clusters by at least a second distance that is at least 20% of the first distance.

17 Claims, 3 Drawing Sheets

CORE UN-BLOCKING ROLLER BRUSH

CROSS-REFERENCE TO RELATED APPLICATIONS

Not applicable.

STATEMENT REGARDING FEDERALLY SPONSORED RESEARCH OR DEVELOPMENT

Not applicable

BACKGROUND

1. Field

The present disclosure generally relates to fabrication of honeycomb structures and, in particular, the process of applying a coating to a honeycomb core.

2. Description of the Related Art

Aerospace structures must meet stringent requirements for strength while also having low weight. One design approach that is utilized in structures such as aircraft wings is a composite assembly having a honeycomb core with rigid skins bonded to both faces of the core. This composite structure makes maximal utilization of the strength properties of the skin material while utilizing a lightweight interior material with adequate strength to meet the service requirements.

A typical step in the fabrication of a composite structure with a honeycomb core is to apply a coating to the walls of the cells of the honeycomb core. A common problem is that the applied coating accumulates disproportionately at the cell entrances and exits, i.e. the openings of the cells at the two faces of the honeycomb core. In some cases, the coating blocks the opening of the cell.

Current methods of unblocking the openings of the honeycomb core cells are to manually strike each opening with a brush to remove the excess coating. This is a slow process and leaves the operator susceptible to repetitive stress injuries.

SUMMARY

There is a need to provide a system and method of removing accumulated material at the opening of structures such as honeycomb cores. The disclosed system and method provide a roller brush configured to penetrate into the cells of a honeycomb core and dislodge excess material that has accumulated at the opening.

The disclosed system includes an unblocking roller having spaced clusters of bristles. The length of the bristles and the spacing of the clusters, relative to the length of the bristles, allow the bristles to penetrate through the openings of the cells of a honeycomb core rather than roll over the face of the honeycomb core without significant penetration of the bristles into the cells. Use of an unblocking roller brush to clear the openings of a honeycomb core provides a more uniform result in a much reduced period of time while reducing the risk of injury to the operator.

In certain embodiments, a roller brush for opening blocked cells in a honeycomb core is disclosed. The roller brush includes a cylindrical core having a center axis and a plurality of clusters each comprising a plurality of bristles. Each of the plurality of bristles of each cluster is coupled to the core at a first end and projects radially outward from the core. Each bristle projects a minimum of a first distance from the core. Each cluster is separated from adjacent clusters by a second distance that is at least 40% of the first distance.

In certain embodiments, a method of opening blocked cells in a honeycomb core is disclosed. The method includes the step of causing a roller having a plurality of bristle clusters each having a plurality of bristles that project a minimum of a first distance from a core wherein each cluster is separated from adjacent clusters by a second distance that is at least 40% of the first distance to pass across a face of the honeycomb core such that the bristles that are proximate to the face at least partially penetrate one or more cells of the honeycomb core.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Fabrication of honeycomb structures requires a significant amount of manual handling. Honeycomb core, prior to being bonded to skins or other structures, is very flexible. Honeycomb cores used in aerospace structures may have cells with a width of less than a 0.25 inch. Coatings must often be applied to the surfaces of the honeycomb core to provide protection or improved adhesion.

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The methods and systems disclosed herein are presented in terms of removal of an excess of a dried coating from the cell openings of a honeycomb core. These same methods and systems can be applied to other structures, such as perforated metal sheets or woven mesh, and other materials, such as paint or adhesive. Nothing in this disclosure should be interpreted, unless specifically stated as such, to limit the application of any claimed method or system disclosed herein to honeycomb structures or dried coatings.

Figure 1:
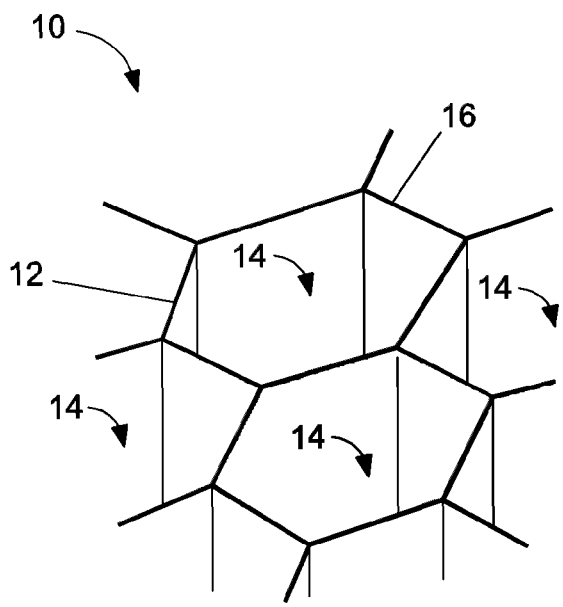
FIG. 1 depicts a face of a honeycomb core.

FIG. 1 depicts a face of a honeycomb core 10. In this example, the honeycomb core 10 is a series of adjacent hexagonal cells 14 separated by walls 12. The cut surface of the honeycomb core 10 forms a face. Honeycomb cores 10 are typically provided as sheets of a uniform thickness with the cells 14 running from a top face 16 to a bottom face (not visible in FIG. 1) through the thickness of the honeycomb core 10. Honeycomb cores used in aerospace structures can have cells with a width, defined as the distance between opposite flat surfaces, of 0.25 inches or less. Honeycomb cores used in other products, for example doors, may have cell widths of an inch or greater.

Figure 2:
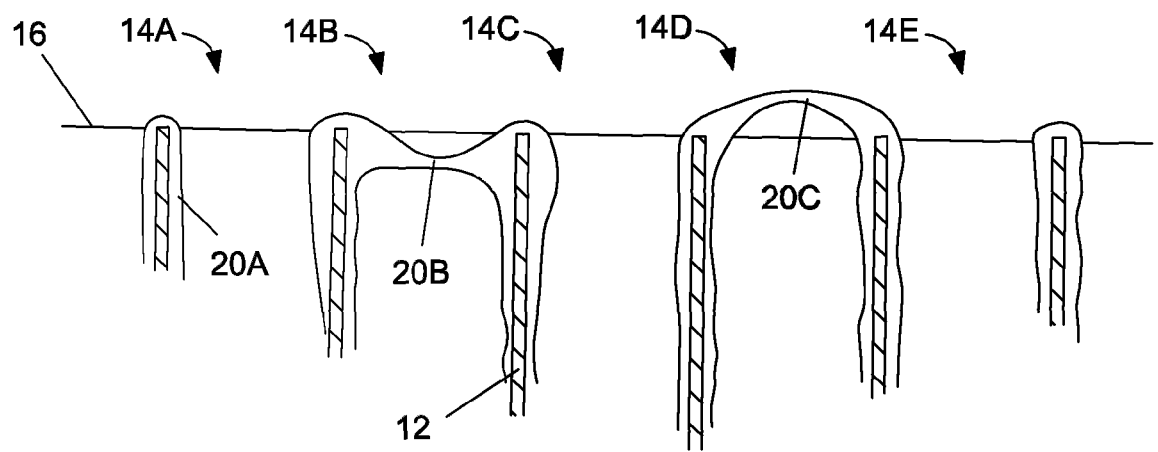
FIG. 2 is a cross-section of a honeycomb core having excess coating material accumulated at the openings of the cells.

FIG. 2 is a cross-section of a honeycomb core 10 having excess coating material 20 accumulated at the openings of the cells 14. In this example, the material 20A has coated the wall 12 of the honeycomb core 10 as intended. Material 20B has bridged the opening of cell 14B. Material 20C has formed a bubble over the opening of cell 14D. It is necessary, in some processes, to remove a sufficient quantity of the material 20B and 20C to open the cells 14B and 14D.

Figure 3:
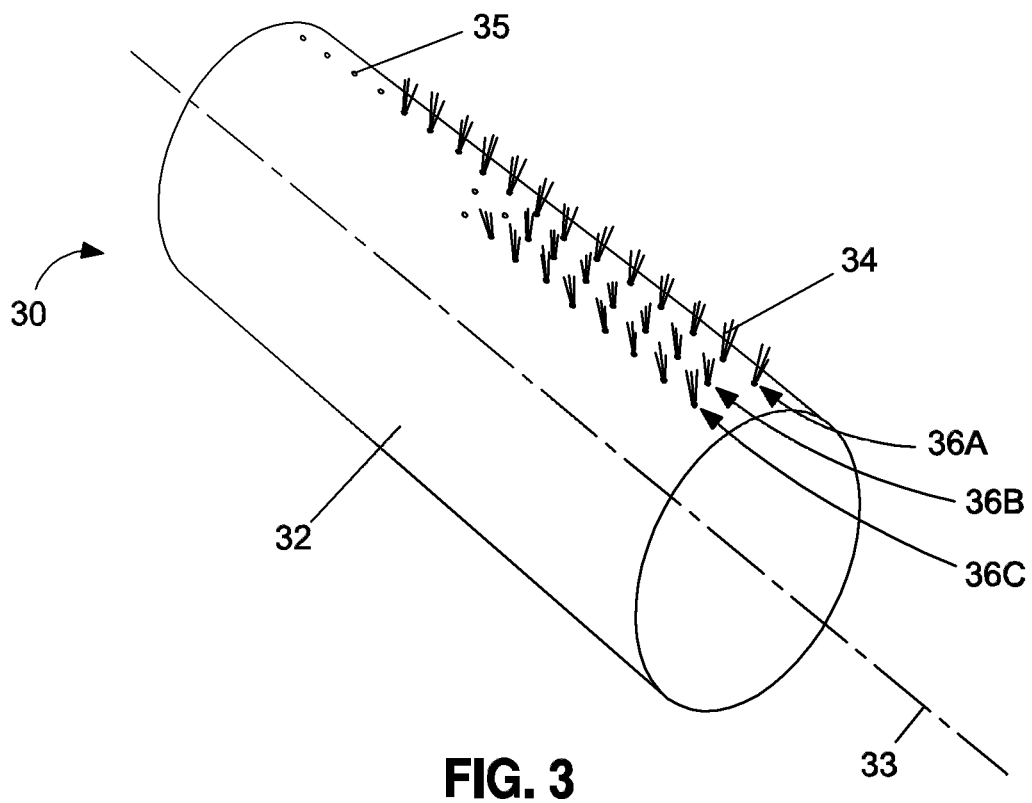
FIG. 3 is a perspective view of an unblocking roller according to certain aspects of this disclosure.

FIG. 3 is a perspective view of an unblocking roller 30 according to certain aspects of this disclosure. In this embodiment, the roller includes a cylindrical core 32 having a center axis 33 along the axis of symmetry of the cylinder. There are bristle clusters 34 arranged in rows 36 that are, in this embodiment, aligned with the axis 33. Only a portion of a few representative rows 32A, 32B, and 32C are depicted to simplify the illustration. In certain embodiments, the rows 36 are configured as spirals around the cylindrical core 32. In certain embodiments, the bristle clusters 34 are generally evenly spaced but are not arranged in rows.

Figure 4:
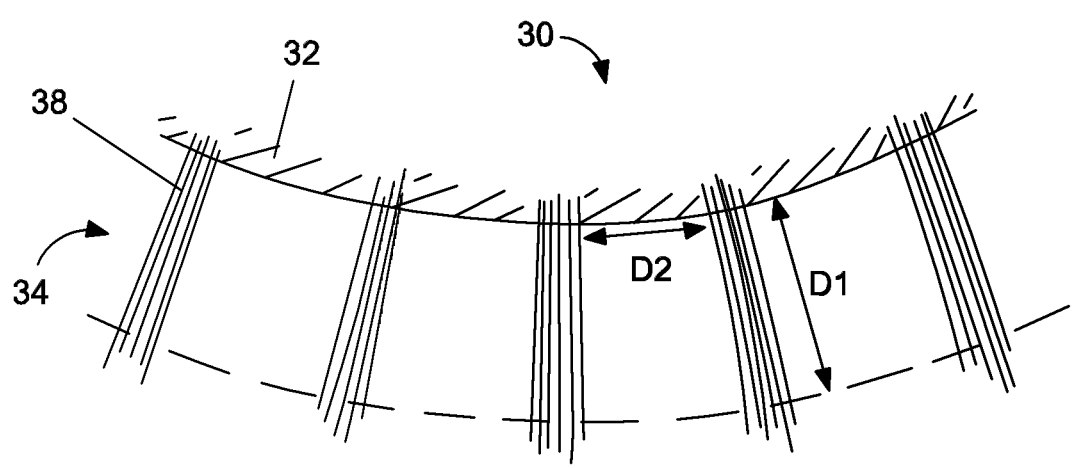
FIG. 4 is an enlarged side view cross-section of the unblocking roller of FIG. 3 according to certain aspects of this disclosure.

FIG. 4 is an enlarged side view cross-section of the unblocking roller 30 of FIG. 3 according to certain aspects of this disclosure. Bristle clusters 34 comprise a plurality of bristles 38. The length of the bristles 38, the number of bristles 38 in a bristle cluster 34, and the spacing of the bristle cluster 34 are important aspects of the design that control whether the unblocking roller 30 effectively penetrates the openings of the cells 14 of the honeycomb core 10. Selection of a combination of roller 32 diameter, bristle 38 length, number of bristles 38 in a bristle cluster 34, and the spacing and arrangement of the bristle clusters 34 is not an obvious extrapolation from existing roller products, such as paint rollers. If the bristles 38 are too short or the bristle clusters 34 are too close together, the unblocking roller 30 tends to roll over the face 16 of the honeycomb core 10 without the bristles 38 removing the excess material 20. If the roller core 32 diameter is too small, the bristle clusters 34 miss some of the cells 14 as the unblocking roller 10 passes across the face 16 of the honeycomb core 10. If the roller core 32 diameter is too large, too many bristle clusters 34 are in contact with the face at the same time and the unblocking roller 30 tends to pass over the face 16 without the bristles 38 penetrating the openings of the cells 14 of the honeycomb core 10 If the bristles 38 are too long, the bristles 38 tend to bend and lay flat over the face 16, therefore not penetrating the cells 14. If there are too many bristles 38 in a bristle cluster 34, the bristle cluster 34 covers too much of the opening of a single cell 14 and therefore rides on the surface 16 and does not penetrate the opening of the cell 14. If there are too few bristles 38 in a bristle cluster 34, then there may be too little stiffness of the bristle cluster to penetrate the dried material 20. If the bristle clusters 34 are too far apart, the unblocking roller 30 unblocks only a portion of the cells 14 as it passes over the face 16, therefore failing to provide a benefit over the prior manual process. It can be seen, from the long list of design choices that lead to failure, that finding the proper combination of multiple design variables of an unblocking roller 30 requires a careful review of the particular features of the problem and an inventive selection of design parameter values to produce an operative unblocking roller 30.

The bristles 38 have a minimum projection distance D1, with additional bristle length to allow the bristles to be coupled to the core 32. In the exemplary embodiment of FIG. 4, the bristles 38 have lengths that are a minimum of D1 with some bristles 38 of each bristle cluster 34 being longer than D1. In certain embodiments, the bristles 38 project a distance within a range of 100% to 150% of D1. In certain embodiments, the bristles 38 project a distance within a range of 100% to 125% of D1. In certain embodiments, the bristles 38 project a distance within a range of 100% to 115% of D1. In certain embodiments, the bristles 38 project a distance within a range of ½ to 1 inch. In certain embodiments, the bristles 38 project a distance within a range of ¾ to ⅞ inch.

In certain embodiments, the bristles 38 are bonded into a cluster 34 with an adhesive, and the clusters 34 are then bonded into holes 35 (as seen in FIG. 1) in the core 32. In certain embodiments, the clusters 34 are bonded to the surface of the core 32. In certain embodiments, the bristles 38 are bonded directly to the core 32.

In certain embodiments, each cluster includes 10-50 bristles 38. In certain embodiments, each cluster includes 18-24 bristles 38.

The bristle clusters 34 are spaced apart, in this embodiment, in rows 36 (seen edge-on in the view of FIG. 4) with a separation distance D2. In certain embodiments, the spacing of bristle clusters 34 along the rows 36 is at the same separation distance D2. In certain embodiments, the bristle clusters 34 are separated along the rows at different distances than D2. In certain embodiments, the bristle clusters are spaced at a plurality of spacings along a row 36. In certain embodiments, the bristle clusters 34 of adjacent rows 36 are offset along the respective rows 36 with respect to the bristle clusters 34 of the adjacent rows 36. In certain embodiments, the bristle clusters 34 are separated by a distance that is at least a determined percentage of the length D1. In certain embodiments, the bristle clusters 34 are separated by a distance that is at least 20% of the length D1. In certain embodiments, the bristle clusters 34 are separated by a distance that is at least 30% of the length D1. In certain embodiments, the bristle clusters 34 are separated by a distance that is at least 40% of the length D1. In certain embodiments, D1 is at least ½ inch. In certain embodiments, D1 is at least ¾ inch. In certain embodiments, D2 is at least 5/16 inch.

In certain embodiments, the diameter of the cylindrical core 32 is less than 5× the length D1. In certain embodiments, the diameter of the cylindrical core 32 is less than 4× the length D1. In certain embodiments, the diameter of the cylindrical core 32 is between 3× and 4× the length D1. In certain embodiments, D1 is ¾ inch and the diameter of the cylindrical core 32 is 2.5 inches.

In certain embodiments, the bristles 38 have a diameter in the range of 0.001-0.050 inch. In certain embodiments, the bristles 38 have a diameter in the range of 0.005-0.020 inch. In certain embodiments, the bristles 38 have a diameter in the range of 0.009-0.011 inch. In certain embodiments, the bristles 38 have a nominal diameter of 0.010 inch. In certain embodiments, the bristles 38 are of a constant thickness over the length D1. In certain embodiments, the bristles 38 taper in thickness over the length D1.

In certain embodiments, the bristles 38 comprise a polymer. In certain embodiments, the bristles 38 comprise a metal. In certain embodiments, the bristles 38 comprise natural fibers, for example horse hair.

Figure 5:
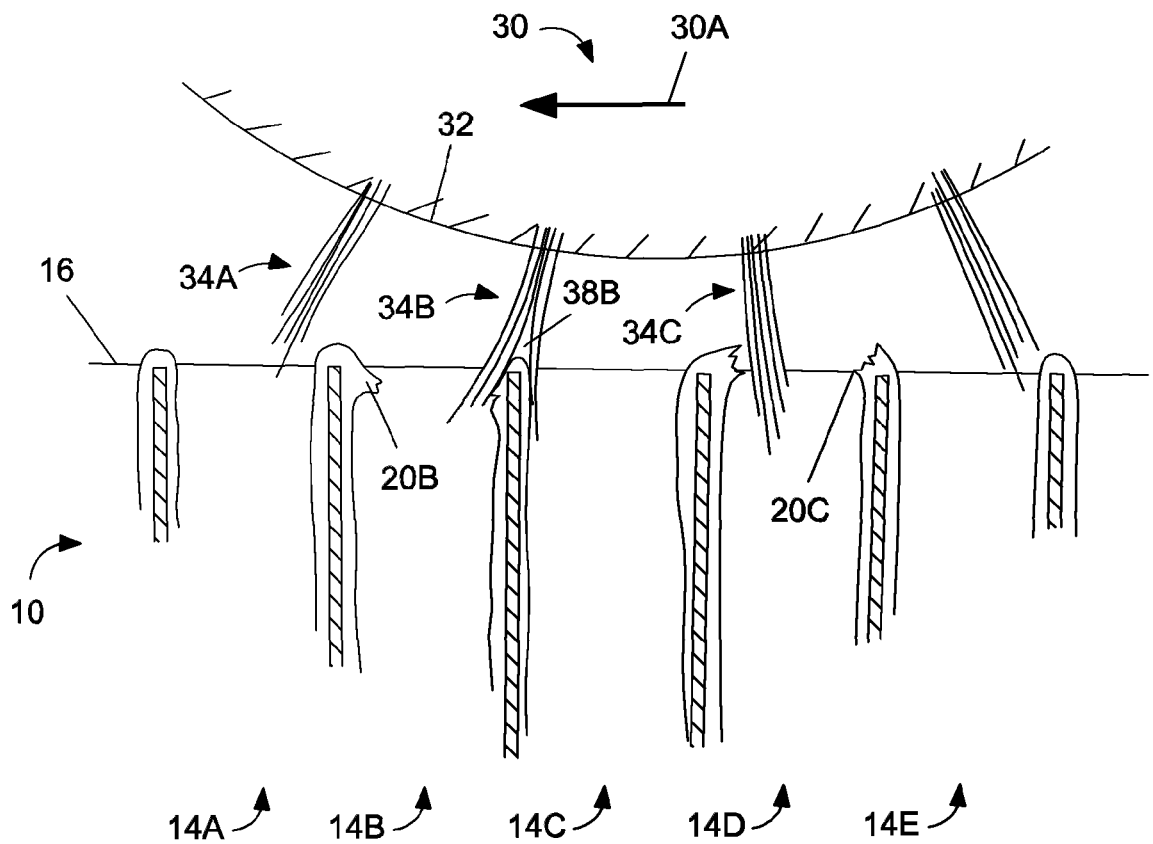
FIG. 5 depicts the operation of an unblocking roller dislodging excess material from a honeycomb core according to certain aspects of this disclosure.

FIG. 5 depicts the operation of an unblocking roller 30 dislodging excess material 20 from a honeycomb core 10 according to certain aspects of this disclosure. Unblocking roller 30 is moving to the left, in the view of FIG. 5, as indicated by arrow 30A and therefore rotating counterclockwise. The bristles 38B of bristle cluster 34B are depicted as penetrating into cells 14B and 14C and have broken away the material 20B that bridged the opening of cell 14B in FIG. 2.

Similarly, bristle cluster 34C has broken away the material 20C that was bubbled over cell 14D. Bristle cluster 34A is approaching the opening of cell 14A, although there is no material 20 that needs to be removed from this cell 14A.

In certain embodiments, the material 20 is a liquid with sufficient viscosity to bridge the openings of cells 14 and the unblocking brush displaces the material 20 while it is a liquid.

Figure 6:
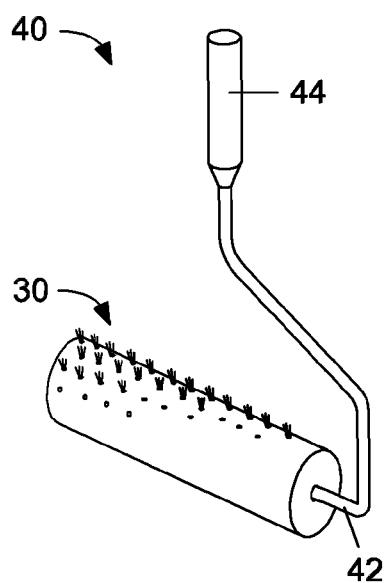
FIG. 6 depicts an unblocking roller assembly according to certain aspects of this disclosure.

FIG. 6 depicts an unblocking roller assembly 40 according to certain aspects of this disclosure. Unblocking roller 30 is coupled to a shaft 42 such that roller 30 can freely rotate about the shaft 42. Shaft 42 is configured with a portion that is over the roller 30, in the view of FIG. 6. A handle 44 is attached to shaft 42. The handle, in this embodiment, is configured to be gripped by the hand of a user (not shown).

In use, the handle 44 of roller assembly 40 is gripped by a user and the roller 30 is brought into contact with the top face 16 of a honeycomb core 10. The roller 30 is then rolled across the face 16 such that the bristles 38 penetrate into the openings of cells 14 under the area covered by the rolling motion. The roller assembly 40 may be moved back and forth several times over the same area. The roller 30 is then raised off the face 16 and repositioned on another portion of the honeycomb core 10 and the rolling process repeated over a new region of cells 14.

In certain embodiments, the roller assembly 40 is rolled over the honeycomb core 10 after a coating material 20 has been applied and allowed to dry. In certain embodiments, the roller assembly 40 is used to apply the coating material 20. In certain embodiments, the roller assembly 40 is used to spread or redistribute the applied coating material 20 while the material 20 is still wet. In certain embodiments, the roller assembly 40 is used to open the cells 14 without redistributing the applied coating material 20 while the coating material 20 is still wet. In certain embodiments, the coating is applied to only the face 16 or a limited depth into the openings of cells 14 and the roller assembly 40 is used to remove material 20 that covers or blocks the openings of the cells 14.

While FIG. 6 depicts an embodiment of a roller assembly 40 for manual use, other embodiments may have shafts 42 or handles 44 of different configurations. For example, the handle may be a long, such as 48 inch, rod (not shown) attached at one end to the shaft 42 such that a user can roll the roller 30 across an area of a honeycomb core 10 farther than one arm's length from an edge of the honeycomb core 10. As a second example, the handle 44 may be replaced with a machine-adapter (not shown) such that the roller 30 can be manipulated by a robotic system (not shown).

The concepts disclosed herein provide an apparatus and method for unblocking the openings of the cells of a honeycomb core when the openings are fully or partially blocked by an applied material. The disclosed unblocking roller has a range of roller core diameter, bristle length, bristle cluster separation and arrangement, and bristle types that are effective at penetrating the openings of the cells of the honeycomb structure.

The previous description is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An unblocking roller for removing excess material from openings of cells in a honeycomb core, the unblocking roller comprising:

a cylindrical core having a center axis and an outer surface; and a plurality of clusters each comprising a plurality of bristles, the plurality of bristles of each cluster coupled to the core and projecting a plurality of distances radially outward from the center axis; wherein a shortest bristle in each cluster projects a first distance from the outer surface of the core and a longest bristle in each cluster projects at least 115% of the first distance from the outer surface of the core;

wherein each cluster is separated from adjacent clusters by at least a second distance that is at least 20% of the first distance.

2. The unblocking roller of claim 1, wherein the first distance is at least 0.5 inch.

3. The unblocking roller of claim 2, wherein the first distance is at least 0.75 inch.

4. The unblocking roller of claim 1, wherein the second distance is at least 30% of the first distance.

5. The unblocking roller of claim 4, wherein the second distance is at least 40% of the first distance.

6. The unblocking roller of claim 1, wherein the core has a diameter that is less than five times the first distance.

7. The unblocking roller of claim 6, wherein the core has a diameter that is at least three times the first distance.

8. The unblocking roller of claim 1, wherein:
the clusters are arranged in evenly spaced rows;
the clusters along each row are evenly spaced at the second distance; and
the clusters of adjacent rows are offset along the respective rows by a third distance that is less than the second distance.

9. The unblocking roller of claim 1, wherein the longest bristle in each cluster projects a fourth distance from the core, and the first distance is 0.75 inches and the fourth distance is 0.875 inches.

10. The unblocking roller of claim 1, wherein each cluster comprises 16-24 bristles.

11. The unblocking roller of claim 1, further comprising:
a shaft coupled to the core such that the core freely rotates about a first portion of the shaft; and
a handle coupled to a second portion of the shaft, the handle configured to be gripped by a hand of a user.

12. An unblocking roller for removing excess material from openings of cells in a honeycomb core, the unblocking roller comprising:

a cylindrical core having a center axis and an outer surface; and a plurality of clusters each comprising a plurality of bristles, the plurality of bristles of each cluster coupled to the core and projecting a plurality of distances radially outward from the center axis; wherein a shortest bristle in each cluster projects a first distance from the outer surface of the core and a longest bristle in each cluster projects at least 125% of the first distance from the outer surface of the core;

wherein each cluster is separated from adjacent clusters by at least a second distance that is at least 20% of the first distance.

13. The unblocking roller of claim 12, wherein the first distance is at least 0.75 inch.

14. The unblocking roller of claim 12, wherein the second distance is at least 30% of the first distance.

15. An unblocking roller for removing excess material from openings of cells in a honeycomb core, the unblocking roller comprising:

a cylindrical core having a center axis and an outer surface; and a plurality of clusters each comprising a plurality of bristles, the plurality of bristles of each cluster coupled to the core and projecting a plurality of distances radially outward from the center axis; wherein a shortest bristle in each cluster projects a first distance from the outer surface of the core and a longest bristle in each cluster projects at least 150% of the first distance from the outer surface of the core;

wherein each cluster is separated from adjacent clusters by at least a second distance that is at least 20% of the first distance.

16. The unblocking roller of claim 15, wherein the first distance is at least 0.75 inch.

17. The unblocking roller of claim 15, wherein the second distance is at least 30% of the first distance.

* * * * *